(12) United States Patent
Lee et al.

(10) Patent No.: US 7,679,646 B2
(45) Date of Patent: Mar. 16, 2010

(54) IMAGE PICKUP SYSTEMS

(75) Inventors: Yu-Ting Lee, Taichung (TW);
Chih-Yang Chiang, Taichung (TW);
Lung-Pin Chung, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 288 days.

(21) Appl. No.: 11/775,270

(22) Filed: Jul. 10, 2007

(65) Prior Publication Data
US 2008/0012950 A1    Jan. 17, 2008

(30) Foreign Application Priority Data
Jul. 17, 2006    (TW) ............................... 95126030 A

(51) Int. Cl.
*H04N 5/228* (2006.01)
(52) U.S. Cl. ............... 348/208.2; 348/208.99; 348/208.4; 348/208.7
(58) Field of Classification Search ............. 348/208.2, 348/208.4, 208.7, 208.99
See application file for complete search history.

(56) References Cited

U.S. PATENT DOCUMENTS

2005/0031326 A1    2/2005    Yamazaki
2005/0270379 A1*    12/2005    Seo .......................... 348/208.5
2006/0056831 A1*    3/2006    Horio et al. .................. 396/55

FOREIGN PATENT DOCUMENTS

JP    08136962    5/1996
JP    11308521    11/1999

* cited by examiner

*Primary Examiner*—John M Villecco
*Assistant Examiner*—Jason Flohre
(74) *Attorney, Agent, or Firm*—Thomas, Kayden, Horstemeyer & Risley

(57) ABSTRACT

Image pickup systems capable of preventing blurred images are provided, in which a first sensor detects a variation in inclination of an image pickup device to generate a first sensing data, a second sensor detects a position movement from an image sensor in the image pickup device to generate a second sensing data and a driving unit is coupled to the image sensor. A processing module receives the first and second sensing data, integrates the first sensing data, calculates the integrated first sensing data and the second sensing data to obtain control information, and enables the driving unit to adjust the position of the image sensor according to the control information.

17 Claims, 4 Drawing Sheets

IMAGE PICKUP SYSTEMS

BACKGROUND OF THE INVENTION

1. Field of the Invention

The invention relates to image pickup systems, and in particular to an image pickup system which integrates a data sensed by an angular velocity signal to compensate vibration.

2. Description of the Related Art

Recently, digital cameras have become a part of every day life, due to ease of use when reviewing and processing captured images in related devices such as computers.

Vibration occurs with all cameras, particularly light and thin digital cameras. Since the hand is often unstable when taking pictures, most cameras contend with unsteady focus due to vibration prior to or at the moment of image capture, resulting in image blur. Thus, anti-vibration mechanisms are always provided in digital cameras.

United State patent publication (2005/0031326) and two Japan patents (H08-136962 and H11-308521) recited within, utilizing a position sensor to detect position movement of the image sensor and a gyro sensor to detect angular velocity to adjust for vibration. The digital camera processor calculates a compensation value according to the detected data to move a compensation lens in the digital camera by a driver for vibration compensation, thereby preventing blurred images caused by camera vibrations. However, excessive movement of a lens to adjust for vibration can cause damage between lenses.

BRIEF SUMMARY OF THE INVENTION

Embodiments of an image pickup system are provided, in which a first sensor detects a variation in inclination of an image pickup device to generate a first sensing data, a second sensor detects a position movement from an image sensor in the image pickup device to generate a second sensing data and a driving unit is coupled to the image sensor. A processing module receives the first and second sensing data, integrates the first sensing data, calculates the integrated first sensing data and the second sensing data to obtain control information, and enables the driving unit to adjust the position of the image sensor according to the control information.

The invention provides another embodiment of a method for pickup images, in which a variation in inclination of an image pickup device is detected to generate a first sensing data by a first sensor and a position movement from an image sensor in the image pickup device is detected to generate a second sensing data by a second sensor. The first sensing data is integrated, and the integrated first sensing data and the second sensing data obtains control information which is calculated, and a driving unit is enabled to adjust the position of the image sensor according to the control information.

The invention provides another embodiment of an image pickup system, in which a gyro sensor detects a variation in inclination of an image pickup device to generate an angular velocity signal of the image pickup device, and a Hall effect sensor detects a position movement from an image sensor in the image pickup device to generate a position signal of the image sensor. A processing module comprises an integrator integrating the angular velocity signal, a combination unit processing the integrated angular velocity signal and the position signal to output a combined data, and a proportional-integral-derivative (PID) controller generating control information according to the combined data. A driver control unit generates a corresponding control signal according to the control information, and a driving unit adjusting the position of the image sensor according to the corresponding control signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
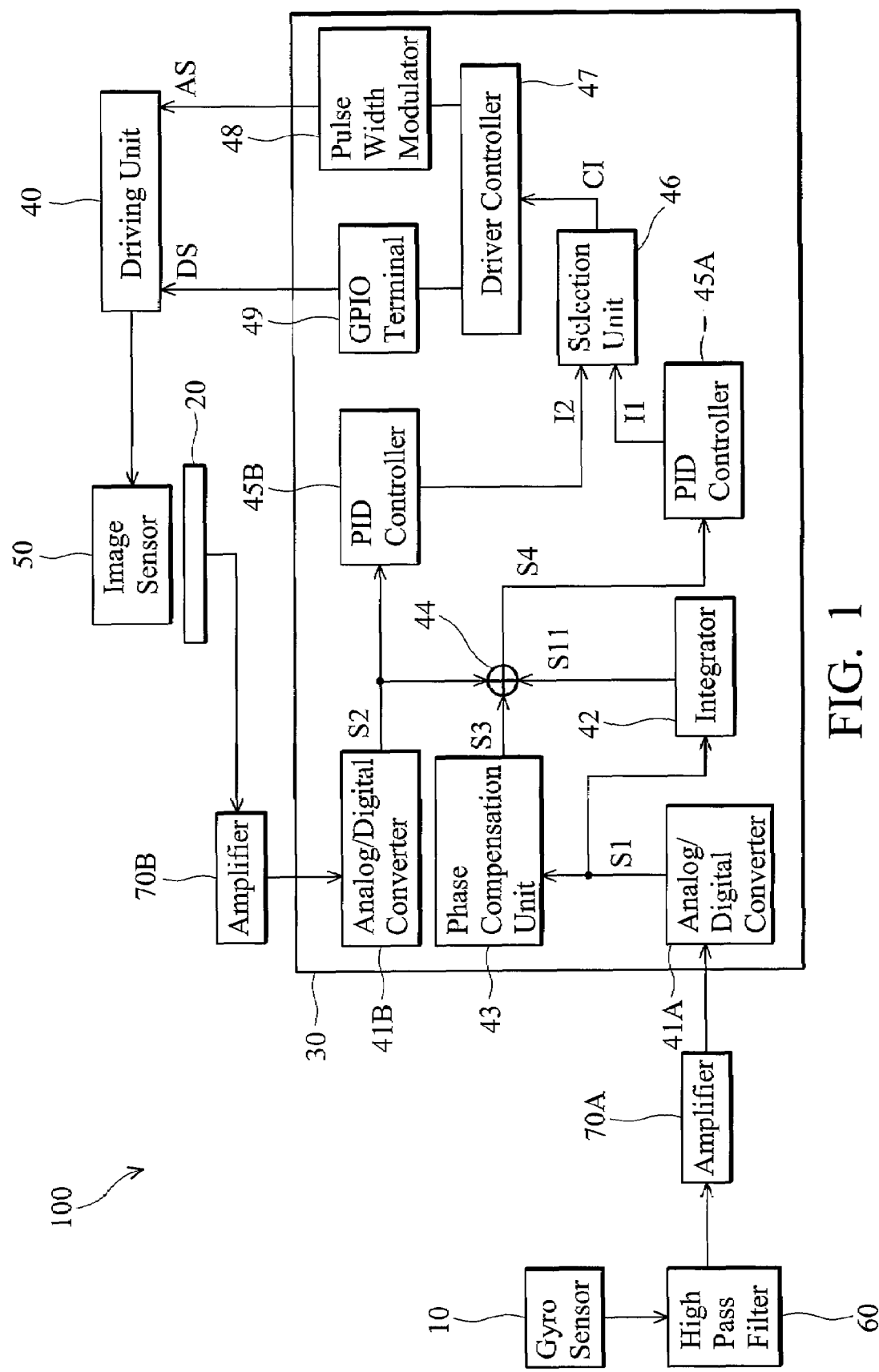
FIG. 1 shows an embodiment of an image pickup system.

FIG. 1 shows an embodiment of an image pickup system. The image pickup system 100 can be implemented as an image pickup device with vibration compensation. An example using an image pickup system includes a digital camera but is not limited thereto. As shown, the image pickup system 100 comprises a gyro sensor 10, a Hall effect sensor 20, a processing module 30, a driving unit 40, an image sensor 50, a high pass filter 60 and amplifiers 70A and 70B.

The gyro sensor 10 can be disposed in the image pick device to detect variations in inclination and generate corresponding sensing data. For example, the gyro sensor 10 generates an angular velocity signal of the image pickup device, the angular velocity signal can be variations in an angular velocity ($\vec{\omega}$) under different times as shown in FIG. 3B, or can be variations in an angular acceleration ($\vec{a}$) under different times as shown in FIG. 3C.

Figure 4A:
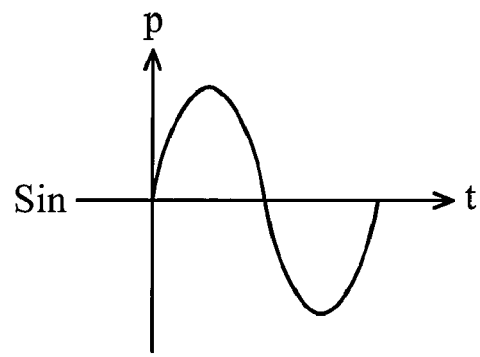
FIG. 4A shows a relationship between variations in position of the image sensor and time.
Figure 4B:
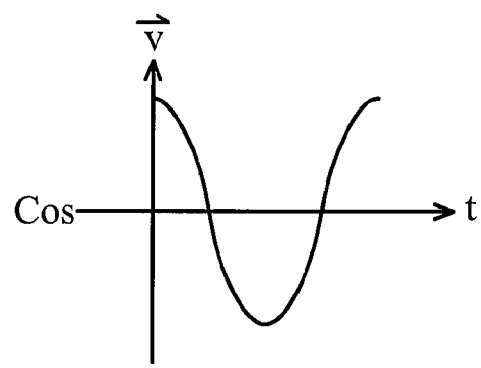
FIG. 4B shows a relationship between variations in movement velocity of the image sensor and time.
Figure 4C:
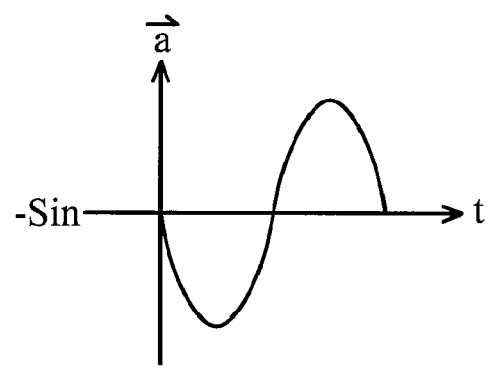
FIG. 4C shows a relationship between variations in movement acceleration of the image sensor and time.

The Hall effect sensor 20 can be disposed adjacent to the image sensor 50 to detect position movement of the image sensor 50 and generate sensing data accordingly. For example, the Hall effect sensor 20 generates a position signal of the image sensor 50. The position signal can be variations in position (p) of the image sensor 50 under different times as shown in FIG. 4A, or variations in movement velocity ($\vec{v}$) of the image sensor 50 under different times as shown in FIG. 4B.

The processing module 30 comprises analog-to-digital converters (ADC) 41A and 41B, an integrator 42, a phase compensation unit 43, a combination unit 44, proportional integral derivative (PID) controllers 45A and 45B, a selection unit 46, a driver controller 47, a pulse width modulator (PWM) 48 and a general purpose input/output (GPIO) terminal 49. The processing module 30 is coupled to the gyro sensor 10, the hall effect sensor 20 and the driving unit 40, integrating the angular velocity signal and calculating control information according to the integrated angular velocity signal and the position signal, such that the driving unit 40 adjusts the position of the image sensor 50 in an image pickup device according to the control information.

In the embodiment, the gyro sensor 10 detects variations in inclination of the image pickup device to generate corresponding data output to the high pass filter 30, thereby eliminating signal shifts or unwanted signals. Then, the filtered signal is transmitted to the ADC converter 41A in the processing module 30 after being amplified by an amplifier 70A. The ADC 41A 30 converts the amplified signal from the amplifier 70A into sensing data S1 and transmits sensing data S1 to the integrator 42 and the phase compensation unit 43. It should be noted that the digital signal from the ADC 41A is also output to the compensation unit 43 for phase compensation and outputs corresponding phase compensation data to the combination unit 44.

In addition, as the amplifier 70B amplifies the Hall effect sensor 20 signal, the amplifier 70B can be integrated into the Hall effect sensor 20 but is not limited thereto. For example, the signal outputted from the amplifier 70B is outputted to the other ADC 41B, such that the signal sensed by the Hall effect sensor 20 is converted into digital sensor data S2 and outputted to the combination unit 44 and the PID controller 45B. The PID controller 45B generates corresponding information I2 according to the received data.

Further, after integrating the sensing data S1, the integrator 42 provides the integrated sensing data S11 to the combination unit 44. The combination unit 44 combines the integrated sensing data S11, the phase compensation data S3 and the sensing data S2 to obtain a combined data S4 output to the PID controller 45A, thereby generating corresponding information I1.

It should be noted that the information I1 and I2 output from PID controllers 45A and 45B are transferred to a selection unit 46, such as a multiplexer. For example, when powering on, the image pickup device can preset the information I2 to serve as the initial compensation setting of the control information C1 and transfer it to the driver controller 47 for vibration compensation. The image pickup can also select the information I1 to serve as the control information C1 according to the user's option and transfer it to the driver controller 47 for vibration compensation.

Driver controller 47 receives the control information C1 from the selection device 46 and outputs pulse width modulation signal AS and direction control signal DS to the driving unit 40 through the pulse width modulator 48 and the GIPO terminal 49.

The driving unit 40 is coupled to the image sensor 50, to receive the pulse width modulation signal AS and direction control signal DS thereafter outputting a control signal to adjust the position of the image sensor 50. It should be noted that the driving unit in the embodiment is not limited to any type, the driving unit 40 can, for example, be one of a coil driving unit, a piezoelectric actuator or a step motor, used to move the position of the image sensor 50 in the image pickup device.

The control signal from the driver controller 47 can be different depending on the design of the driving unit 40. For example, the control signal can be a control voltage for the driving unit 40, such that the driving unit 40 can adjust the image sensor 50 at different levels according to different pulse frequencies or different pulse widths.

Figure 2:
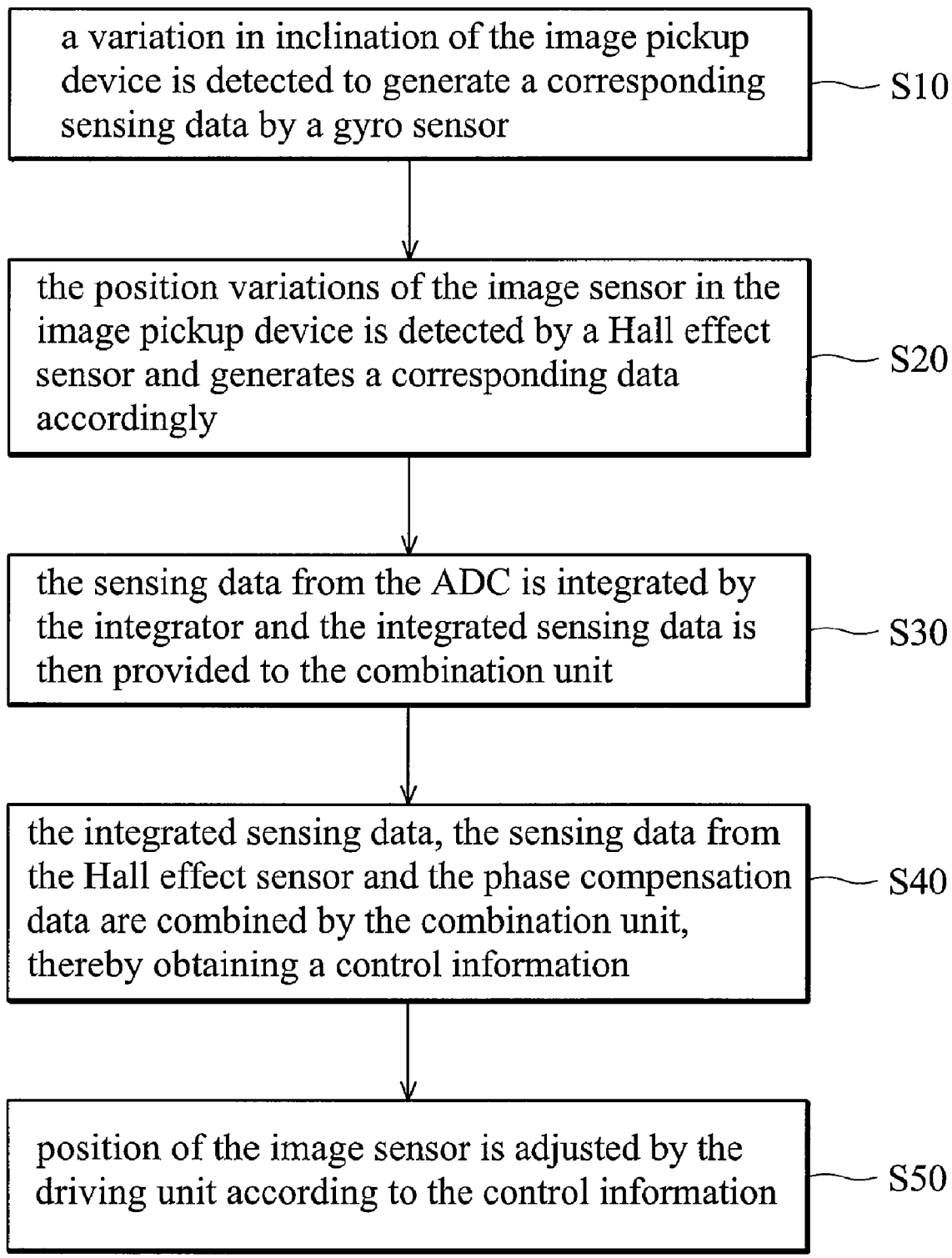
FIG. 2 shows a flowchart of the image pickup method in the embodiment.

Image sensor 50 can be CCD or a CMOS disposed on a support frame (not shown) which can move up, down, left or right, to pick up images. For example, the moveable support frame can adjust the position of the image sensor 50 in the image pickup device to compensate for vibration thereby preventing blurred images The invention also provides an embodiment of an image pickup method. FIG. 2 shows a flowchart of the image pickup method in the embodiment.

In step S10, a variation in inclination of the image pickup device is detected to generate sensing data by a gyro sensor 10. Next, the gyro sensor 10 outputs an angular velocity signal of the image pickup device, i.e., variations in angular velocity under different times as shown in FIG. 3B or variations in angular acceleration under different times as shown in FIG. 3C. It should be noted that the signal detected by the gyro sensor 10 is transmitted to the high pass filter to remove signal shifts or unwanted signal components and then is amplified by the amplifier 70A. The amplified signal (i.e. the signal detected by the gyro sensor 10) is converted to a digital signal S1 by the ADC 41A and transmitted to the integrator 42 and the phase compensation unit 43.

In step S20, the position variations of the image sensor 50 in the image pickup device is detected by a Hall effect sensor 20 and generates corresponding data accordingly. Next, the Hall effect sensor 20 generates a position signal of the image sensor 50, i.e., position variations under different times shown in FIG. 4A, or velocity variations under different times as shown in FIG. 4B. The signal detected by the Hall effect sensor 20 is amplified by the amplifier 70B, then converted into a digital sensing data S2 by the ADC 41B and transmitted to the combination unit 44 and the PID controller 45B.

In step S30, the sensing data S1 from the ADC 41A is integrated by the integrator 42 and the integrated sensing data S11 is transmitted to the combination unit 44. In addition, the sensing data S1 from the ADC 41A is also processed by a phase compensation unit 43 to provide corresponding phase compensation data S3 to the combination unit 44.

In step S40, integrated sensing data S11, sensing data S2 and phase compensation data S3 are combined by the combination unit 44, thereby obtaining control information CI. It should be noted that the combined data from combination unit 44 is processed by the PID controller 45A to obtain information I1 and the sensing data S2 from the ADC 41B is processed by the PID controller 45B to obtain information I2. The respective information I1 and I2 output from the PID controllers 45A and 45B is transferred to the selection unit 46 and the information I1 and I2 is output as control information CI under different conditions. For example, when powering on, the image pickup device can preset information I2 to function as the initial compensation setting of control information C1 for vibration compensation. In addition, the information I1 can also be selected to function as control information C1 for vibration compensation according to user's options.

It should be noted that the signal sensed by the gyro sensor 10 can comprises variations in an angular velocity ($\vec{\omega}$) under different times as shown in FIG. 3B, or variations in an angular acceleration ($\vec{a}$) under different times as shown in FIG. 3C. Further, the signal sensed by the Hall effect sensor 20 can comprise variations in position (p) of the image sensor 50 under different times as shown in FIG. 4A, or variations in movement velocity ($\vec{v}$) of the image sensor 50 under different times as shown in FIG. 4B. Thus, there are at least three methods to obtain the combined data S4 of the combination unit 44 in the embodiment.

Figure 3A:
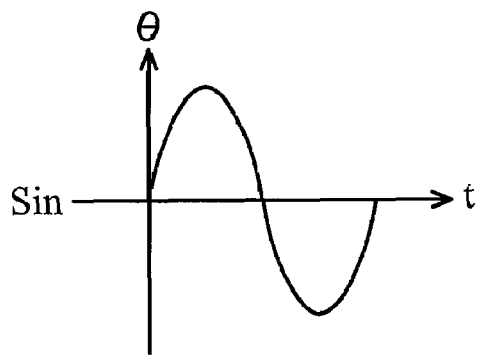
FIG. 3A shows a relationship between an angular signal of an image pickup device.
Figure 3B:
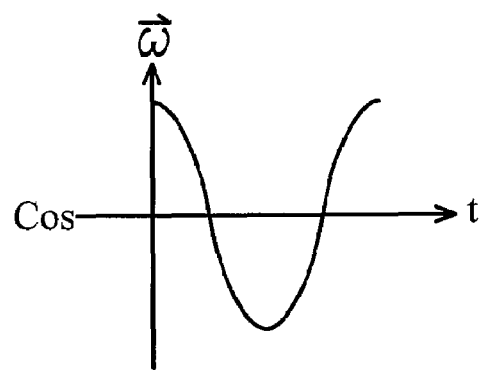
FIG. 3B shows a relationship between variations in angular velocity of the image pickup device and time.
Figure 3C:
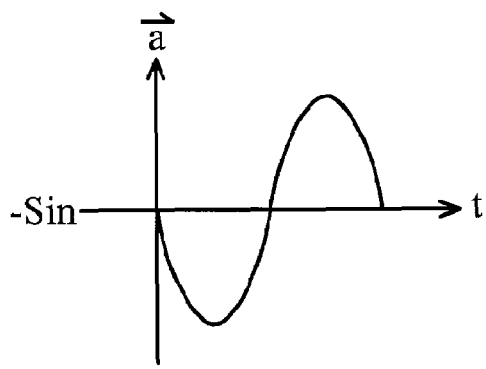
FIG. 3C shows a relationship between variations in angular acceleration and time.

If the sensing signal sensed by the gyro sensor 10 is variations in an angular velocity ($\vec{\omega}$) shown in FIG. 3B and the signal sensed by the Hall effect sensor 20 is variations in position (p) of the image sensor 50 shown in FIG. 4A, the angular velocity signal sensed by the gyro sensor 10 is integrated by integrator 42 to become an angular signal shown in FIG. 3A. The angular signal and the position movement sensed by the Hall effect sensor are combined (or compared) to obtain the combined data S4.

Alternately, if the signal sensed by the Hall effect sensor 20 is variations in movement velocity ($\vec{v}$) of the image sensor 50 shown in FIG. 4B, variations in an angular acceleration ($\vec{a}$) sensed by the gyro sensor 10 is integrated by the integrator 42 to become the angular velocity signal shown in FIG. 3A. The angular velocity signal and the movement velocity sensed by the Hall effect sensor are combined (or compared) to obtain the combined data S4.

Moreover, if the signal sensed by the gyro sensor 10 is variations in an angular acceleration ($\vec{a}$) under different times as shown in FIG. 3C and the signal sensed by the Hall effect sensor 20 is variations in position (p) of the image sensor 50 shown in FIG. 4A, variations in an angular acceleration ($\vec{a}$) sensed by the gyro sensor 10 is integrated trice by the integrator 42 to become the angular velocity signal shown in FIG. 3A. The angular velocity signal and the movement velocity sensed by the Hall effect sensor are combined (or compared) to obtain the combined data S4.

In step S50, position of the image sensor 50 is adjusted by the driving unit 40 according to the control information CI. For example, the driver controller 47, according to the control information CI, controls the pulse width modulator 48 and the GPIO terminal 49 to output a pulse width modulation signal AS and a direction signal DS to function as the control signal for adjusting the position of the image sensor 50.

It should be note that the driving unit in the embodiment is not limited to any type, and the driving unit 40 can, for example, be one of a coil driving unit, a piezoelectric actuator or a step motor used to move the position of the image sensor 50 in the image pickup device. The control signal from the driver controller 47 can be different depending on the design of the driving unit 40. For example, the control signal can be a control voltage for the driving unit 40, wherein according to different pulse frequencies or different pulse widths, the driving unit 40 will adjust the image sensor 50 at different levels.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image pickup system, comprising:
    a first sensor detecting a variation in inclination of an image pickup device to generate a first sensing data;
    a second sensor detecting a position movement from an image sensor in the image pickup device to generate a second sensing data;
    a driving unit coupled to the image sensor; and
    a processing module receiving the first and second sensing data, integrating the first sensing data, calculating the integrated first sensing data and the second sensing data to obtain control information, and enabling the driving unit to adjust the position of the image sensor according to the control information,
    wherein the processing module further comprises:
    a combination unit processing the integrated first sensing data and the second sensing data to output a combined data; and
    a phase compensation unit calculating phase compensation data according to the first sensing data, transferring the phase compensation data to the combining unit, such that the combining unit processes the integrated first sensing data, the second sensing data and the phase compensation data to output the combined data.

2. The image pickup system as claimed in claim 1, wherein the first sensor comprises a gyro sensor.

3. The image pickup system as claimed in claim 1, wherein the second sensor comprises a Hall effect sensor.

4. The image pickup system as claimed in claim 1, wherein the first sensing data comprises an angular velocity signal of the image pickup device.

5. The image pickup system as claimed in claim 1, wherein the second sensing data comprises a position signal of the image sensor.

6. The image pickup system as claimed in claim 1, wherein the processing module comprises:
    a first integrator integrating the first sensing data; and
    a first proportional-integral-derivative (PID) controller receiving the combined data to generate a first information to serve as the control information.

7. The image pickup system as claimed in claim 6, wherein the processing unit further comprises at least one analog to digital converter converting the first sensing data and the second sensing data into digital data.

8. The image pickup system as claimed in claim 6, wherein the processing module further comprises:
    a second PID controller receiving the second sensing data to generate a second information; and
    a selection unit coupled to the first and second PID controllers, selectively outputting the first information or the second information to serve as the control information.

9. The image pickup system as claimed in claim 8, wherein the selection unit outputs the first information or the second information to serve as the control information according to user input instructions.

10. A method for pickup images, comprising:
    detecting a variation in inclination of an image pickup device to generate a first sensing data by a first sensor;
    detecting a position movement an image sensor in the image pickup device to generate a second sensing data by a second sensor;
    integrating the first sensing data;
    calculating phase compensation data according to the first sensing data;
    calculating the integrated first sensing data, the second sensing data and the phase compensation data to obtain control information; and
    enabling a driving unit to adjust the position of the image sensor according to the control information.

11. The method as claimed in claim 10, wherein the first sensing data comprises an angular velocity signal of the image pickup device.

12. The method as claimed in claim 10, wherein the second sensing data comprises a position signal of the image sensor.

13. The method as claimed in claim 10, further comprising:

generating a first information to serve as the control information according to the combined data by a proportional-integral-derivative (PID) controller.

14. The method as claimed in claim 13, further comprising:
generating a second information according to the second sensing data by another PID controller; and
outputting the first information or the second information to serve as the information.

15. The method as claimed in claim 14, wherein the first information or the second information is output to serve as the control information according to constructions input by users.

16. An image pickup system, comprising:
a gyro sensor detecting a variation in inclination of an image pickup device to generate an angular velocity signal of the image pickup device;
a Hall effect sensor detecting a position movement from an image sensor in the image pickup device to generate a position signal of the image sensor; and
a processing module, comprising:
an integrator integrating the angular velocity signal;
a combination unit processing the integrated angular velocity signal and the position signal to output a combined data; and
a proportional-integral-derivative (PID) controller generating control information according to the combined data;
a driver control unit generating a corresponding control signal according to the control information; and
a phase compensation unit calculating phase compensation data according to the angular velocity signal, transferring the phase compensation data to the combining unit, such that the combining unit processes the integrated angular velocity signal, the position signal and the phase compensation data to output the combined data; and
a driving unit adjusting the position of the image sensor according to the corresponding control signal.

17. The image pickup system as claimed in claim 16, wherein the processing unit further comprises at least one analog to digital converter converting the angular velocity signal and the position signal into digital data.

* * * * *